June 6, 1967 E. T. DUNCAN 3,324,304
EMERGENCY POWER SUPPLY
Filed Oct. 28, 1963
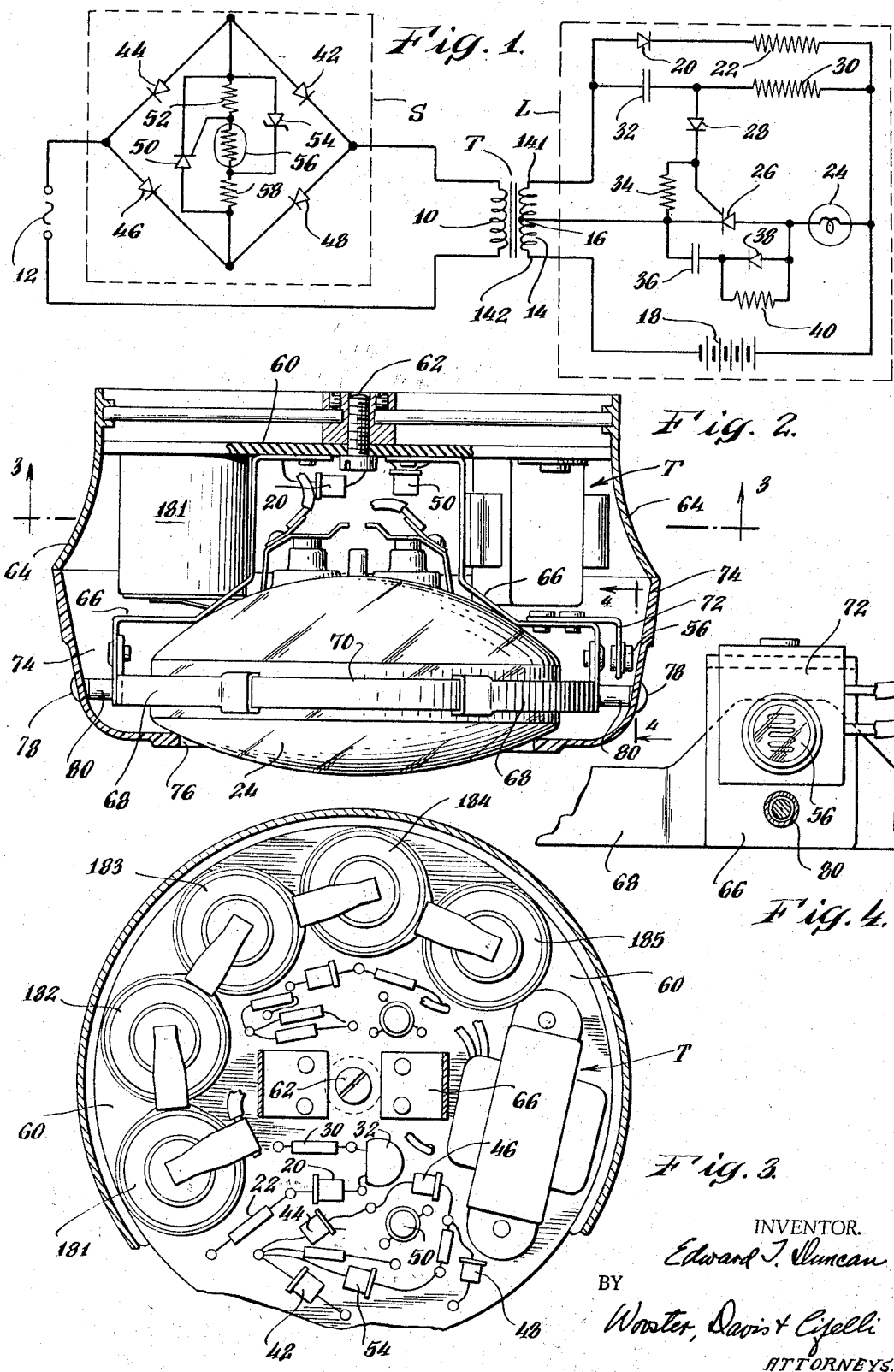
INVENTOR.
Edward T. Duncan
BY
Wooster, Davis & Cifelli
ATTORNEYS.

United States Patent Office 3,324,304
Patented June 6, 1967

3,324,304
EMERGENCY POWER SUPPLY
Edward T. Duncan, Westport, Conn., assignor to The Maintenance Company, Inc., Long Island City, N.Y., a corporation of New York
Filed Oct. 28, 1963, Ser. No. 319,180
11 Claims. (Cl. 307—66)

This invention relates to an emergency power supply unit which is actuated either by loss of power or by an environmental change. More particularly, the invention relates to an emergency lighting unit which is energized by either loss of power or failure of surrounding illumination.

There are many applications for emergency power supply units in our modern civilization. This is largely due to the fact that we have become a people dependent on a continued supply of electrical power. For example, there is disclosed in my copending United States patent application, Ser. No. 222,574, filed Sept. 10, 1962, now U.S. Patent 3,159,755, an emergency unit which is responsive to a change in its enviroment to produce a desired result. In the unit specifically described in that application, the environment to which the unit responds is illumination and the result obtained is the lighting of an emergency lamp. As is pointed out therein, one of the more important applications of such a circuit is in the field of elevator lighting. This is because elevators are self-contained units which receive no outside illumination. Accordingly, the disclosed emergency light prevents an elevator cab from being plunged into darkness even though the normal light source may burn out or be otherwise impaired.

There is also disclosed in my copending patent application, Ser. No. 311,095, filed Sept. 24, 1963, an emergency power supply which is actuated from loss of electrical power alone. That application also includes a disclosure of an emergency lighting unit although the scope of the invention is not so limited.

One of the disadvantages of the power supply units known to the prior art is their lack of flexibility. For example, emergency power supply units which are actuated by loss of power are well-known in the prior art. It has also been proposed to provide power supply units which are actuated by environmental changes such as loss of illumination. This is the type of apparatus disclosed in the aforementioned patent application 222,574. However, it would be highly desirable to provide a single unit which is actuated by either loss of power or by an environmental change.

Other disadvantages of prior art units are that they often incorporate relays and similar elements. Relays consume substantial amounts of power, even while in a standby condition. Furthermore, they are subject to mechanical failure, are sensitive to vibration, and the heat they generate tends to damage other components of the unit.

Accordingly, it is the primary object of the present invention to provide an improved emergency power supply unit. Other objects are to provide such a unit which is responsive to either loss of power or an environmental change; to provide a unit which is substantially maintenance free and consumes minor amounts of electrical energy; to provide such a unit which is insensitive to vibration and which requires no moving parts; and to provide an emergency lighting unit which is responsive to either loss of electriacl power or failure of ambient illumination.

The foregoing objects are achieved by the present invention wherein there is provided a power supply unit, such as en emergency light, which is actuated either by loss of power or by a change in environmental conditions. Although the embodiment particularly described below is a lighting unit which responds to illumination changes, it is to be understood that the invention is not so limited. The unit could also be caused to respond to other environmental changes such as heat, humidity, smoke or vapor etc., by replacing the photosensitive device with a different type of sensor. It will also be understood that the emergency light which is actuated could be replaced or supplemented by such devices as an alarm or a recorder.

The construction and operation of the apparatus of this invention will be more fully understood by reference to the following description, the appended claims and the figures of the attached drawing, wherein:

FIG. 1 is a circuit diagram of an emergency light unit constructed in accordance with this invention;

FIG. 2 is a cross section of an emergency light and housing incorporating the circuit of FIG. 1;

FIG. 3 is a cross section taken along the line 3—3 of FIG. 2; and

FIG. 4 is an enlarged cross section taken along the line 4—4 of FIG. 2.

The operation of this invention may be best understood by reference to the circuit diagram of FIG. 1. For purposes of illustration, the circuit of this invention may be considered as comprising a lamp control portion L which is responsive to power failure, a transformer T supplying power to the control portion L, and a switching portion S which controls the application of power to transformer T in response to ambient lighting conditions. The primary winding 10 of transformer T is connected in series with the switching portion S to an alternating current power supply 12. The secondary 14 of transformer T is provided with a tap 16 and supplies the lamp control portion L. The lamp control portion L comprises a battery 18 of rechargeable cells such as nickel-cadmium sealed cells. Battery 18 is connected in series with a charging circuit comprising a crystal diode 20 and a 7.5 ohm. current limiting resistor 22. The charging circuit is energized from the terminals 141, 142 of the secondary winding 14 of transformer T. The lighting circuit of the lamp control portion L comprises a lamp 24 in series with a solid state rectifier 26 which, in the illustrated embodiment, is a silicon-controlled rectifier. The lamp 24 is connected between the positive terminal of battery 18 and the anode of the silicon-controlled rectifier 26. The cathode of the rectifier is in turn connected to tap 16 of the transformer secondary 14. The control circuit for activating controlled rectifier 26 comprises a crystal diode 28, which is connected to the gate of the controlled rectifier 26 and is tapped between a relatively high resistance 30 and a capacitor 32 characterized by a high 60-cycle impedance. In the illulstrated embodiments, for example, the value of resistance 30 is 100,000 ohms and capacitor 32 is a .2 mfd. capacitor. A 39,000 ohm resistor 34 is connected across the gate-cathode circuit of the controlled rectifier 26. A filter network comprising capacitor 36, diode 38, and resistor 40 is connected across the controlled rectifier as illustrated to protect it from possible transient peaks.

The operation of that portion of the circuit identified as the lamp control portion L may be best understood by assuming that alternating current is being supplied from the secondary winding 14 of the transformer T. The secondary winding provides a voltage of approximately 12 volts between terminals 141, 142. The battery 18 has a voltage rating of 7.0 volts. The diode 20 is polarized so that charging current flows from the terminal 141 through diode 20, resistor 22, and battery 18, returning to terminal 142 to maintain the battery in a constant state of charge. During this time, resistor 30 allows a very small current flow through capacitor 32 and the voltage applied to diode 28 from the midpoint between resistor 30 and capacitor 32 is insufficient to trigger the controlled rectifier 26 into conduction. Accordingly, this rectifier remains in the "open" state so that lamp 24 remains unlighted.

Assume now that transformer T is deenergized, either by power failure or by the operation of switching portion S as will be later explained. Under these circumstances, the secondary winding 14 becomes a low resistance conductor and a reversal of current and polarities results. The capacitor 32 is now subjected to the voltage of battery 18. Accordingly, the charge on the capacitor builds until it discharges through the diode 28 to the gate of the controlled rectifier 26, triggering the rectifier into the "closed" state. Current immediately begins to flow in a reverse direction from the positive side of battery 18 through lamp 24 and rectifier 26 and back to the negative terminal of the battery through that portion of the secondary winding 14 between tap 16 and terminal 142. The gating current that is required to maintain the rectifier 26 in its "closed" state is supplied from the battery 18 through the resistor 30. Accordingly, the lamp 24 remains lighted for as long as A.C. potential is absent from the transformer secondary.

When the transformer T is again energized, the first negative pulse to the controlled rectifier 26 will cause the flow of rectifier current to stop. Capacitor 32 once more discharges, but this time in the opposite direction, and then recharges to its original polarity The lamp 24 goes off and this portion of the circuit has thereupon reverted to its original state.

That portion L of the circuit of the invention which has been just described is sensitive to loss of power to actuate an emergency light. However, one of the objects of this invention is to make the emergency light actuatable upon either loss of power or loss of ambient illumination. This latter object is achieved by combining circuit portion L and supply transformer T with the switching portion S. Switching portion S comprises a full wave rectifier formed by crystal diodes 42, 44, 46, 48. The D.C. branch of the full wave rectifier includes a silicon-controlled rectifier 50 polarized so as to normally conduct D.C. when in its "closed" state. A 200 ohms resistor 52, a cadmium sulfide photosensitive resistor 56, and a 470 ohm resistor 58 are connected in series across the anode-cathode circuit of silicon-controlled rectifier 50. These elements form a voltage divider for supplying the gate of the controlled rectifier from the tap between resistors 52 and 56. The avalanche diode 54 regulates the voltage drop across resistors 52 and 56. So long as an inadequate amount of light shines on the cadmium sulfide cell 56, the silicon-controlled rectifier 50 receives no gate current and cannot conduct across the D.C. potential supplied by the full wave rectifier. Accordingly, the circuit portion S under such circumstances functions as an open switch which prevents current flow to the primary 10 of transformer T. When light does shine upon the cadmium sulfide cell 56, the silicon-controlled rectifier 50 is caused to commutate into its "closed" state. This allows alternating current to flow to the primary 10 of transformer T, energizing its secondary 14 with the results previously described.

It will be apparent from the above description of the circuit of FIG. 1 that this invention provides a means for automatically energizing a desired component upon either a power failure or a lighting failure. The switching portion S is sensitive to ambient light so as to conduct power current to transformer T only during the time that ambient light is available. The lamp control portion L, which is thereby energized, merely operates to provide a continuous trickle charge to the battery 18 while lamp 24 remains off. If ambient lighting or the A.C. power supply 12 fails, however, the switching portion S will cease to conduct current to the primary of transformer T, thereby deenergizing this transformer and causing the silicon-controlled rectifier 26 in the lamp control portion L to be activated, allowing battery current to pass through emergency lamp 24 in the manner described above.

A particular apparatus employing the circuit of FIG. 1 is illustrated in FIGS. 2, 3, and 4. The illustrated device is designed for ceiling mounting in an elevator cab although, of course, various other modifications are possible. In the illustrated embodiments, the various elements are given numbers which correspond to the numbers of corresponding circuit elements of FIG. 1. The various cells making up battery 18 are numbered 181–185.

In the light illustrated in FIGS. 2–4, the various electrical and electronic components are mounted on a base 60 which is constructed of a suitable material such as a rigid insulating plastic. The base 60 is of disc shape and is provided with a central mounting hole for receiving a mounting screw 62 for connection to a suitable fixture. One such type of suitable fixture, for example, would be a circular ventilator louver of the type used in elevators. The lighting unit would then be housed within the central louver ring 64. Attached to and extending outwardly from the base 60 are a pair of lamp support brackets 66 which carry at their outer ends spring clamps 68 which detachably engage the rim 70 of a lamp 24 of sealed beam construction. The cadmium sulfide cell 56 is positioned on a spearate bracket 72 outwardly of one of the brackets 66. The unit is completed by a transulcent plastic housing 74 which abuts the lower edge of the central louver ring 64 and has a central opening 76 encircling the convex lens of the lamp 24. The housing 74 is secured by means of screws 78 which extend therethrough and into suitable studs 80 mounted on the brackets 66.

The use of a transulcent housing enables the photosensitive cell 56 to be mounted out of sight and protected from dust and dirt while still being in a position to receive ambient light. Accordingly, when the unit of the invention is mounted in a central location, for example, in the center of an elevator cab ceiling, the photosensitive cell 56 is positioned to receive any light emitted from the elevator cab's standard lighting system. Failure of either the light or the power or both will then activate the unit as described above.

The many advantages of this invention will be immediately apparent to those skilled in the art. It will also be apparent that many variations and modifications may be made in this invention without departing from its spirit and scope. Accordingly, it is to be understood that the foregoing description is illustrative only rather than limiting. This invention is limited only by the scope of the following claims.

What I claim as new and desire to secure by Letters Patent of the United States is:

1. An emergency power supply apparatus comprising: transformer means having a secondary winding including first and second terminals and a primary winding; rechargeable battery means and first rectifier means connected in electrical series relationship with said first and second terminals to maintain said battery in a charged condition from said transformer means; solid state switching means including an anode, a cathode, and a gate; load means connected in series with said anode and cathode, the series circuit being connected in parallel with said battery; a series circuit comprising second rectifier means and relatively high impedance capacitor means connected between said second terminal and gate; environment responsive control means connected in series with the primary of said transformer, said control means being operable to selectively pass and block current flow to said primary upon a preselected environmental change; and means for connecting said control means and primary to a source of alternating electrical power.

2. The apparatus of claim 1 wherein said solid state switching means is a silicon controlled rectifier.

3. The apparatus of claim 1 wherein said first and second rectifier means are crystal diodes.

4. The apparatus of claim 1 wherein said load means is a lamp.

5. The apparatus of claim 1 wherein said environment responsive control means comprises a full wave rectifier having its A.C. circuit in series with said primary and switching means in its D.C. circuit, said switching means being operable to pass and block D.C. current flow therethrough upon a preselected environmental change.

6. The apparatus of claim 5 wherein said switching means comprises a solid state controlled rectifier.

7. The apparatus of claim 6 wherein said switching means comprises a photosensitive element in controlling relationship to the gate of said rectifier.

8. The apparatus of claim 7 wherein said photosensitive element is one element of a voltage divider across said D.C. circuit and wherein the gate of said rectifier is connected to said voltage divider.

9. The apparatus of claim 8 wherein an avalanche diode is connected in parallel with at least a portion of said voltage divider.

10. Electrical circuit control means comprising: a full wave rectifier having its A.C. circuit in series with an element to be controlled and a solid state controlled rectifier in its D.C. circuit operable to pass and block D.C. current flow therethrough; a photosensitive element and impedance means connected in a series circuit across said controlled rectifier; and means connecting the gate of said controlled rectifier directly to said series circuit whereby said controlled rectifier is operable to pass and block D.C. current flow therethrough upon a change in intensity of light incident on said photosensitive element.

11. The apparatus of claim 10 wherein an avalanche diode is connected in parallel with at least a portion of said voltage divider.

References Cited

UNITED STATES PATENTS

| | | | |
|---|---|---|---|
| 3,119,057 | 1/1964 | Wilson | 307–64 X |
| 3,149,224 | 9/1964 | Horne | 219—505 X |
| 3,159,755 | 12/1964 | Duncan | 307—66 X |
| 3,161,759 | 12/1964 | Gambill | 219—501 X |
| 3,189,788 | 6/1965 | Cady | 307—66 X |
| 3,222,535 | 12/1965 | Englehardt | 307—66 |

ORIS L. RADER, *Primary Examiner.*

T. J. MADDEN, *Assistant Examiner.*